US009485464B2

(12) United States Patent
Lin et al.

(10) Patent No.: US 9,485,464 B2
(45) Date of Patent: Nov. 1, 2016

(54) PROCESSING METHOD FOR VIDEO CONFERENCE AND SERVER USING THE METHOD

(71) Applicant: HON HAI PRECISION INDUSTRY CO., LTD., New Taipei (TW)

(72) Inventors: Kuan-Hung Lin, New Taipei (TW); Chih-Yuan Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/748,982

(22) Filed: Jun. 24, 2015

(65) Prior Publication Data

US 2016/0065894 A1 Mar. 3, 2016

(30) Foreign Application Priority Data

Aug. 28, 2014 (TW) ............................ 103129639 A

(51) Int. Cl.
*H04N 7/15* (2006.01)

(52) U.S. Cl.
CPC ...................................... *H04N 7/15* (2013.01)

(58) Field of Classification Search
CPC .......... H04N 7/15; H04N 7/152; H04N 7/14; H04N 7/147
USPC ........................................... 348/14.01–14.16
See application file for complete search history.

(56) References Cited

U.S. PATENT DOCUMENTS

2003/0076435 A1* 4/2003 Sato .................. H04N 1/00442 348/333.11
2009/0002477 A1* 1/2009 Cutler ............... G06K 9/00711 348/14.1
2009/0210491 A1 8/2009 Thakkar et al.
2009/0282103 A1 11/2009 Thakkar et al.
2009/0327894 A1 12/2009 Rakib et al.
2012/0182381 A1* 7/2012 Abate ................ H04L 12/1822 348/14.03
2013/0169742 A1* 7/2013 Wu ....................... H04N 7/152 348/14.08

FOREIGN PATENT DOCUMENTS

TW 200943818 A 10/2009
TW 200943962 A 10/2009
TW 200948069 A1 11/2009

* cited by examiner

*Primary Examiner* — Melur Ramakrishnaiah
(74) *Attorney, Agent, or Firm* — Zhigang Ma

(57) ABSTRACT

In a processing method for a video conference, start speaking events and end speaking events of endpoints joined in the video conference are detected. Video streaming of a speaking endpoint is displayed in a speaking area of a foreground window of a display device. A current time "t", a duration time "T" of the video conference, a start speaking time "$s_i$" and an end speaking time "$e_i$" of the endpoints are recorded. Real-time activity scores of each of the endpoints are calculated and updated according to video recording contents. Video streaming of non-speaking endpoints are displayed in corresponding areas of the display device according to the calculated activity scores.

13 Claims, 5 Drawing Sheets

300

Start

302 Detect start speaking events and end speaking events of endpoints joined in a video conference 304 Control a display device to display video streaming of a speaking endpoint in a speaking area of a foreground window 306 Record a current time "t", a duration time "T" of the video conference, a start speaking time "$s_i$" and an end speaking time "$e_i$" of each of the endpoints 308 Calculate and update real-time activity scores of each of the endpoints according to video recording contents 310 Control the display device to display video streaming of non-speaking endpoints in corresponding areas according to the calculated activity scores End

PROCESSING METHOD FOR VIDEO CONFERENCE AND SERVER USING THE METHOD

CROSS-REFERENCE TO RELATED APPLICATIONS

This application claims priority to Taiwanese Patent Application No. 103129639 filed on Aug. 28, 2014, the contents of which are incorporated by reference herein.

FIELD

The subject matter herein generally relates to video conferencing.

BACKGROUND

If a display device displays video streaming of all endpoints joined in a video conference, the video streaming may crowd a display screen, and a speaking endpoint cannot be displayed. If the display device only displays video streaming of the speaking endpoint on the screen, other non-speaking endpoints cannot be displayed.

BRIEF DESCRIPTION OF THE DRAWINGS

Implementations of the present technology will now be described, by way of example only, with reference to the attached figures.

DETAILED DESCRIPTION

Figure 1:
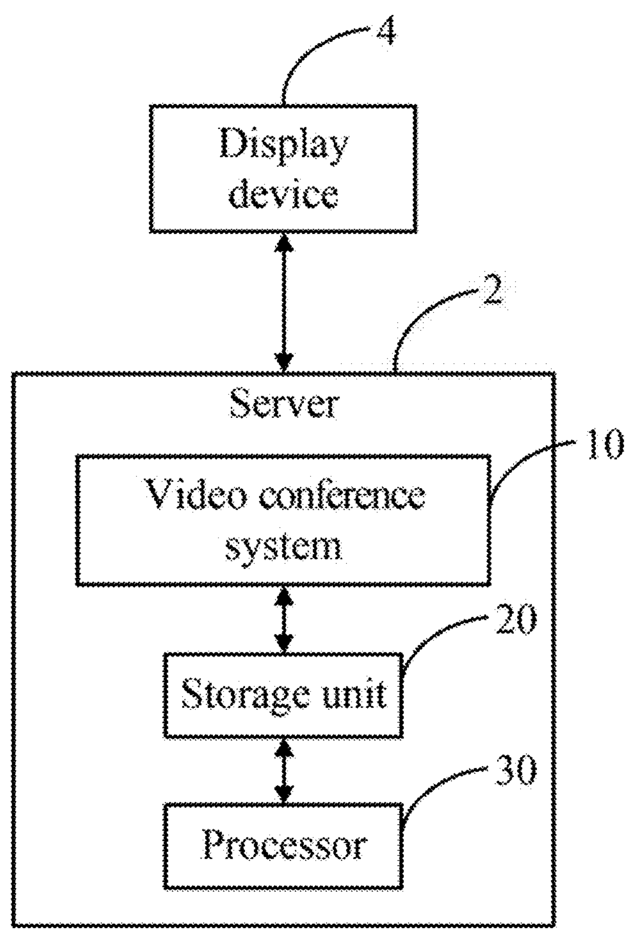
FIG. 1 illustrates a block diagram of an embodiment of a server including a video conference system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of an embodiment of a server 2. In the embodiment, the server 2 includes a video conference system 10, a storage unit 20, and a processor 30. The server 2 is electronically connected to a display device 4. In the embodiment, the server 2 receives video streaming of all endpoints (not shown) joined in a video conference and transmits the video streaming to the display device 4.

Figure 2:
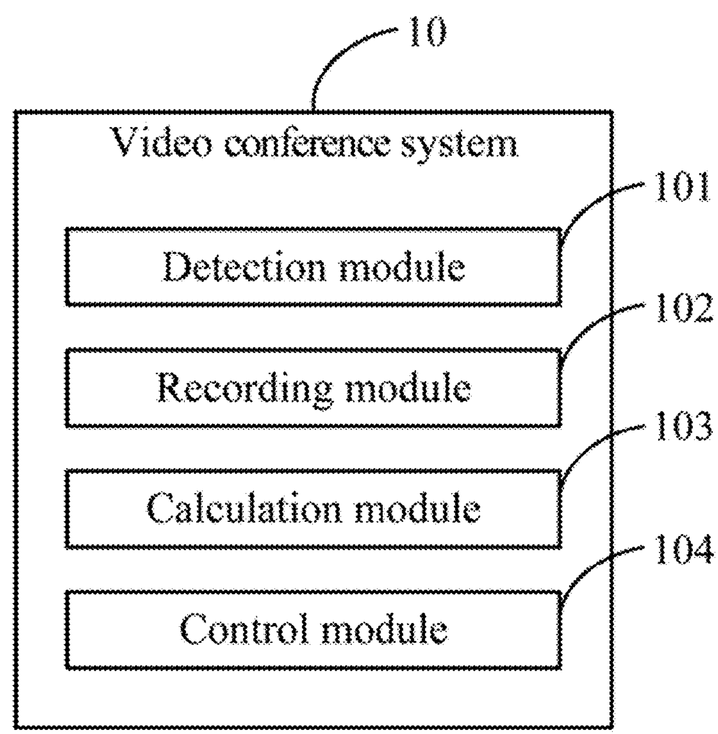
FIG. 2 illustrates a block diagram of an embodiment of function modules of the video conference system in FIG. 1.

FIG. 2 illustrates a block diagram of an embodiment of function modules of the video conference system 10. The one or more function modules can include computerized code in the form of one or more programs that are stored in the storage unit 20, and executed by the processor 30 to provide functions of the video conference system 10. The storage unit 20 can be a dedicated memory, such as an EPROM or a flash memory.

In an embodiment, the video conference system 10 includes a detection module 101, a recording module 102, a calculation module 103, and a control module 104. Descriptions of the functions of the modules 101-104 are given with reference to FIG. 5.

Figure 5:
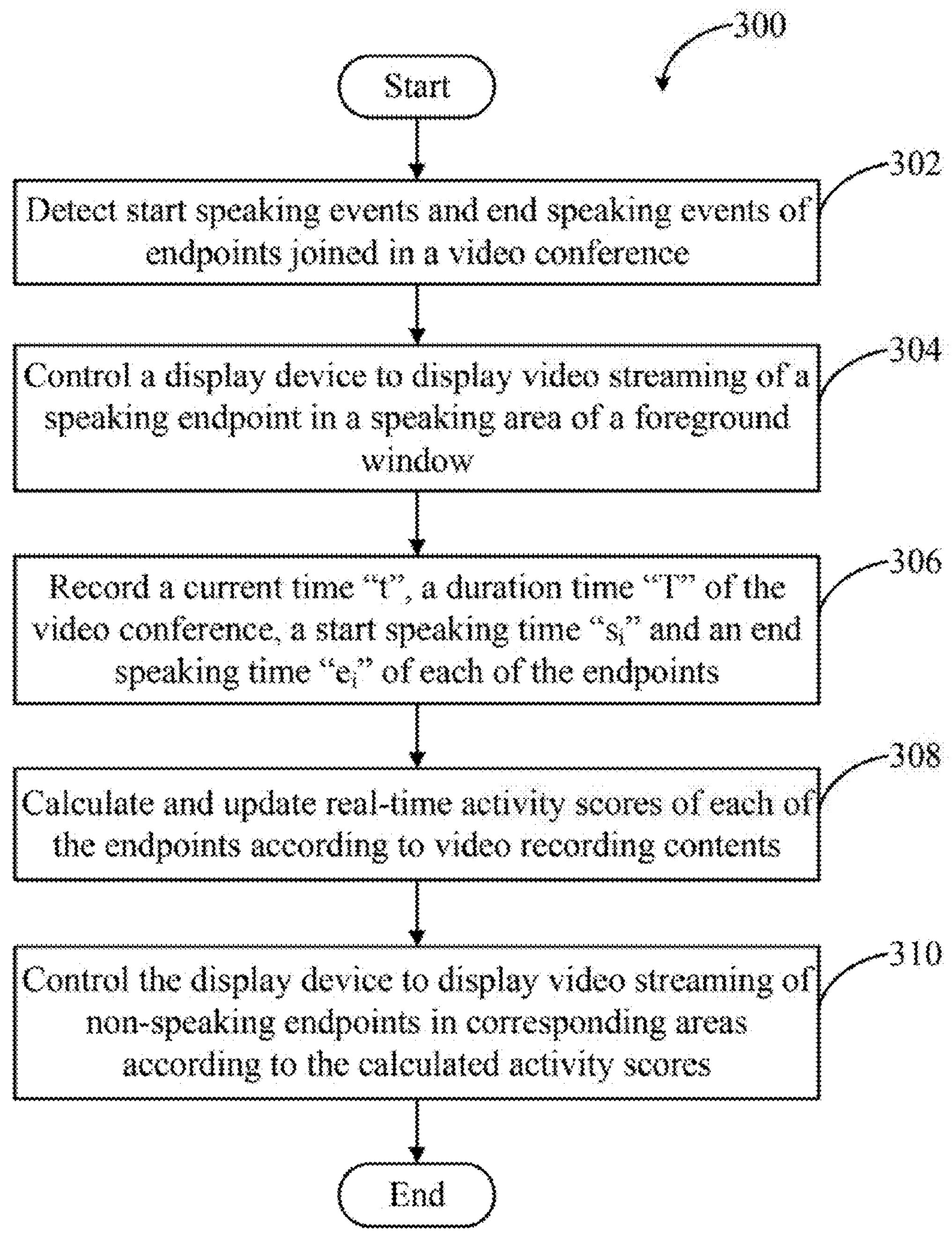
FIG. 5 illustrates a flowchart of an embodiment of a processing method for the video conference.

Referring to FIG. 5, a flowchart is presented in accordance with an example embodiment of a processing method 300 for the video conference. The processing method 300 is provided by way of example, as there are a variety of ways to carry out the method. The method 300 described below can be carried out using the configurations illustrated in FIGS. 1 and 2, for example, and various elements of these figures are referenced in explaining the processing method 300. Each block shown in FIG. 5 represents one or more processes, methods, or subroutines, carried out in the exemplary processing method 300. Additionally, the illustrated order of blocks is by example only and the order of the blocks can change. The processing method 300 can begin at block 302.

At block 302, the detection module 101 detects start speaking events and end speaking events of endpoints joined in the video conference.

Figure 4:
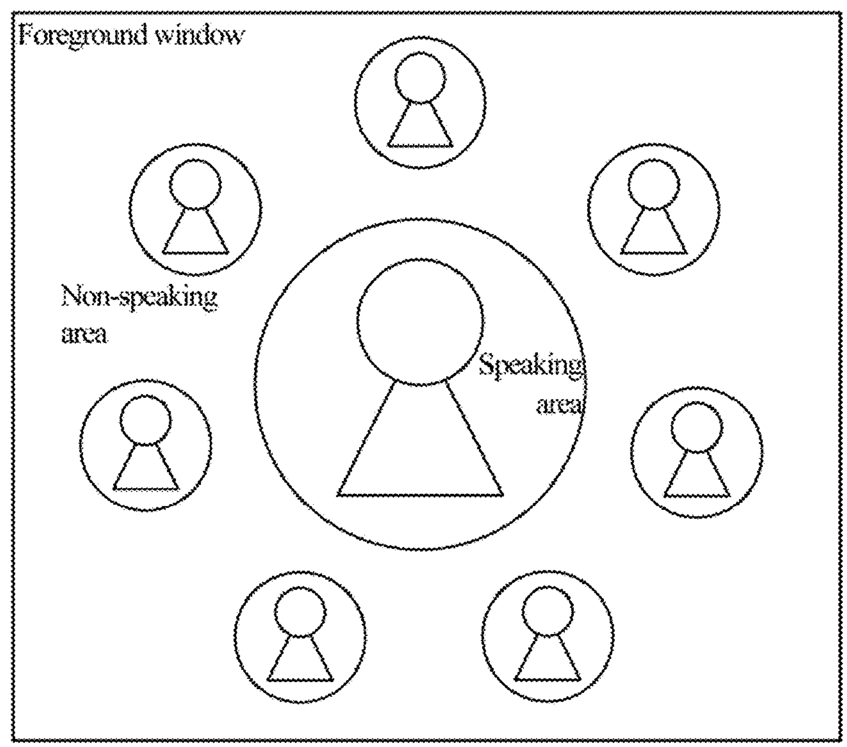
FIG. 4 illustrates a diagrammatic view of an embodiment of a foreground window.

At block 304, the control module 104 controls the display device 4 to display video streaming of a speaking endpoint in a speaking area of a foreground window (as shown in FIG. 4). In the embodiment, the foreground window is a biggest area of a display area of a screen of the display device 4. The speaking area is located at the center of the foreground window.

Figure 3:
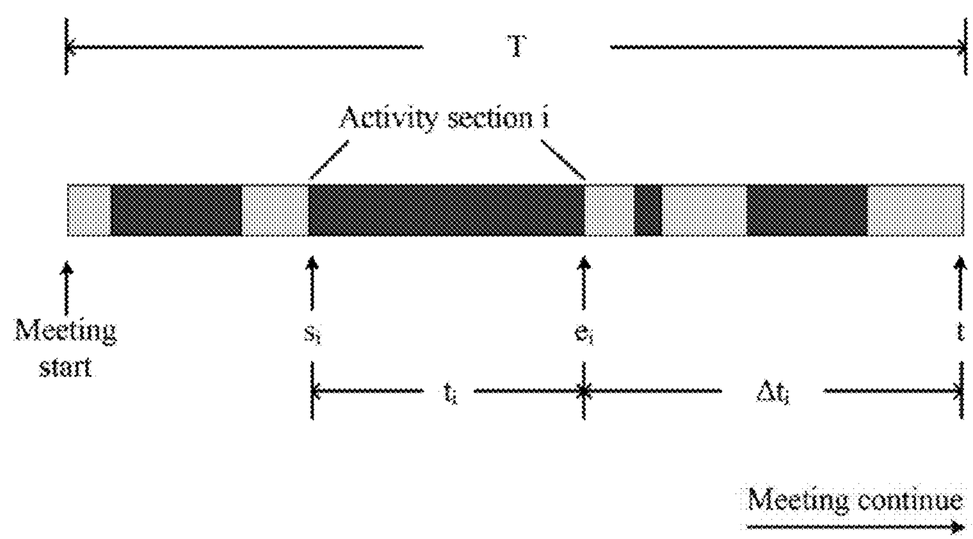
FIG. 3 illustrates a diagrammatic view of an embodiment of each time record corresponding to a video conference.

At block 306, the recording module 102 records a current time "t", a duration time "T" of the video conference, a start speaking time "$s_i$" and an end speaking time "$e_i$" of each of the endpoints. FIG. 3 shows an embodiment of above-mentioned time of the video conference.

At block 308, the calculation module 103 calculates and updates real-time activity scores (S) of each of the endpoints according to video recording contents. In the embodiment, the activity score is calculated according to a formula represented as $$S = \sum_{i=1}^{n} (1 - \Delta t_i / T)^3 t_i,$$

wherein $t_i = e_i - s_i$, and $\Delta t_i = t - e_i$. The above-mentioned time and the activity score of each endpoint are stored in the storage unit 20.

At block 310, the control module 104 controls the display device 4 to display video streaming of non-speaking endpoints in corresponding areas according to the calculated activity scores. If the activity score of the non-speaking endpoint is not less than a first preset value $S_1$ ($S \geq S_1$), the control module 104 controls the display device 4 to display the video streaming of the non-speaking endpoint in a non-speaking area of the foreground window. In the embodiment, as shown in FIG. 4, the non-speaking area is located around the speaking area. The control module 104 can dynamically adjust a distance between two adjacent endpoints in the non-speaking area according to an amount of the endpoints displayed in the non-speaking area. In other embodiments, the speaking area and the non-speaking area can be in other positions of the foreground window. For example, the speaking area can be located at the top of the foreground window, the non-speaking area can be located at the bottom of the foreground window, and the dimensions of the speaking area are greater than the dimensions of the non-speaking area.

If the activity score of the non-speaking endpoint is less than the first preset value $S_1$ and greater than a second preset value $S_2$ ($S_2 < S < S_1$), the control module 104 controls the display device 4 to display the video streaming of the non-speaking endpoint in a background window. It is understood that the second preset value $S_2$ is less than the first preset value $S_1$. If the activity score of the non-speaking endpoint is not greater than the second preset value $S_2$ ($S \leq S_2$), the control module 104 controls the display device 4 to stop displaying the video streaming of the non-speaking endpoint. In the embodiment, the non-displayed video streaming of the non-speaking endpoint can stop transmitting among the endpoints of the video conference, to save bandwidth.

The embodiments shown and described above are only examples. Many details are often found in the art such as the other features of a server. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a processor of a server, the method comprising:

detecting start speaking events and end speaking events of endpoints joined in a video conference;

displaying video streaming of a speaking endpoint in a speaking area of a foreground window of a display device;

recording a current time "t", a duration time "T" of the video conference, a start speaking time "$s_i$" and an end speaking time "$e_i$" of each of the endpoints;

calculating and updating real-time activity scores of each of the endpoints according to video recording contents; and displaying video streaming of non-speaking endpoints in corresponding areas of the display device according to the calculated activity scores.

2. The method as claimed in claim 1, further comprising:

displaying video streaming of a non-speaking endpoint in a non-speaking area of the foreground window, in event an activity score of the non-speaking endpoint is not less than a first preset value;

displaying the video streaming of the non-speaking endpoint in a background window of the display device, in event the activity score of the non-speaking endpoint is less than the first preset value and greater than a second preset value; or stopping displaying the video streaming of the non-speaking endpoint, in event the activity score of the non-speaking endpoint is not greater than the second preset value.

3. The method as claimed in claim 1, wherein the activity score S is calculated according to a formula represented as $$S = \sum_{i=1}^{n} (1 - \Delta t_i / T)^3 t_i,$$

where $t_i = e_i - s_i$, and $\Delta t_i = t - e_i$.

4. The method as claimed in claim 1, wherein the speaking area is located at the center of the foreground window while the non-speaking area is located around the speaking area.

5. The method as claimed in claim 1, wherein the speaking area is located at the top of the foreground window, the non-speaking area is located at the bottom of the foreground window, and the dimensions of the speaking area are greater than the dimensions of the non-speaking area.

6. A non-transitory storage medium, storing a set of instructions, the set of instructions being executed by a processor of a server, to perform a method comprising:

detecting start speaking events and end speaking events of endpoints joined in a video conference;

displaying video streaming of a speaking endpoint in a speaking area of a foreground window of a display device;

recording a current time "t", a duration time "T" of the video conference, a start speaking time "$s_i$" and an end speaking time "$e_i$" of the endpoints;

calculating and updating real-time activity scores of each of the endpoints according to video recording contents; and displaying video streaming of non-speaking endpoints in corresponding areas of the display device according to the calculated activity scores.

7. The non-transitory storage medium as claimed in claim 6, wherein the method further comprises:

displaying video streaming of a non-speaking endpoint in a non-speaking area of the foreground window, in event an activity score of the non-speaking endpoint is not less than a first preset value;

displaying the video streaming of the non-speaking endpoint in a background window of the display device, in event the activity score of the non-speaking endpoint is less than the first preset value and greater than a second preset value; or stopping displaying the video streaming of the non-speaking endpoint, in event the activity score of the non-speaking endpoint is not greater than the second preset value.

8. The non-transitory storage medium as claimed in claim 6, wherein the activity score S is calculated according to a formula represented as $$S = \sum_{i=1}^{n} (1 - \Delta t_i / T)^3 t_i,$$

where $t_i = e_i - s_i$, and $\Delta t_i = t - e_i$.

9. The non-transitory storage medium as claimed in claim 6, wherein the speaking area is located at the center of the foreground window while the non-speaking area is located around the speaking area.

10. The non-transitory storage medium as claimed in claim 6, wherein the speaking area is located at the top of the foreground window, the non-speaking area is located at the bottom of the foreground window, and the dimensions of the speaking area are greater than the dimensions of the non-speaking area.

11. A server, the server comprising:

at least one processor;

a storage unit; and one or more programs that are stored in the storage unit and executed by the at least one processor, the one or more programs comprising instructions for:

detecting start speaking events and end speaking events of endpoints joined in a video conference;

displaying video streaming of a speaking endpoint in a speaking area of a foreground window of a display device;

recording a current time "t", a duration time "T" of the video conference, a start speaking time "$s_i$" and an end speaking time "$e_i$" of each of the endpoints;

calculating and updating real-time activity scores of each of the endpoints according to video recording contents; and displaying video streaming of non-speaking endpoints in corresponding areas of the display device according to the calculated activity scores.

12. The server as claimed in claim 11, wherein the one or more programs further comprises instructions for:

displaying video streaming of a non-speaking endpoint in a non-speaking area of the foreground window, in event an activity score of the non-speaking endpoint is not less than a first preset value;

displaying the video streaming of the non-speaking endpoint in a background window of the display device, in event the activity score of the non-speaking endpoint is less than the first preset value and greater than a second preset value; or stopping displaying the video streaming of the non-speaking endpoint, in event the activity score of the non-speaking endpoint is not greater than the second preset value.

13. The server as claimed in claim 11, wherein the activity score S is calculated according to a formula represented as $$S = \sum_{i=1}^{n} (1 - \Delta t_i / T)^3 t_i,$$

where $t_i = e_i - s_i$, and $\Delta t_i = t - e_i$.

* * * * *